July 8, 1952 J. H. PHILLIPS 2,602,377
WORK FEEDING DEVICE FOR MILLING MACHINES AND THE LIKE
Filed Dec. 3, 1948 6 Sheets—Sheet 1

Inventor
John H. Phillips
By Hiee &Hiee
Attys.

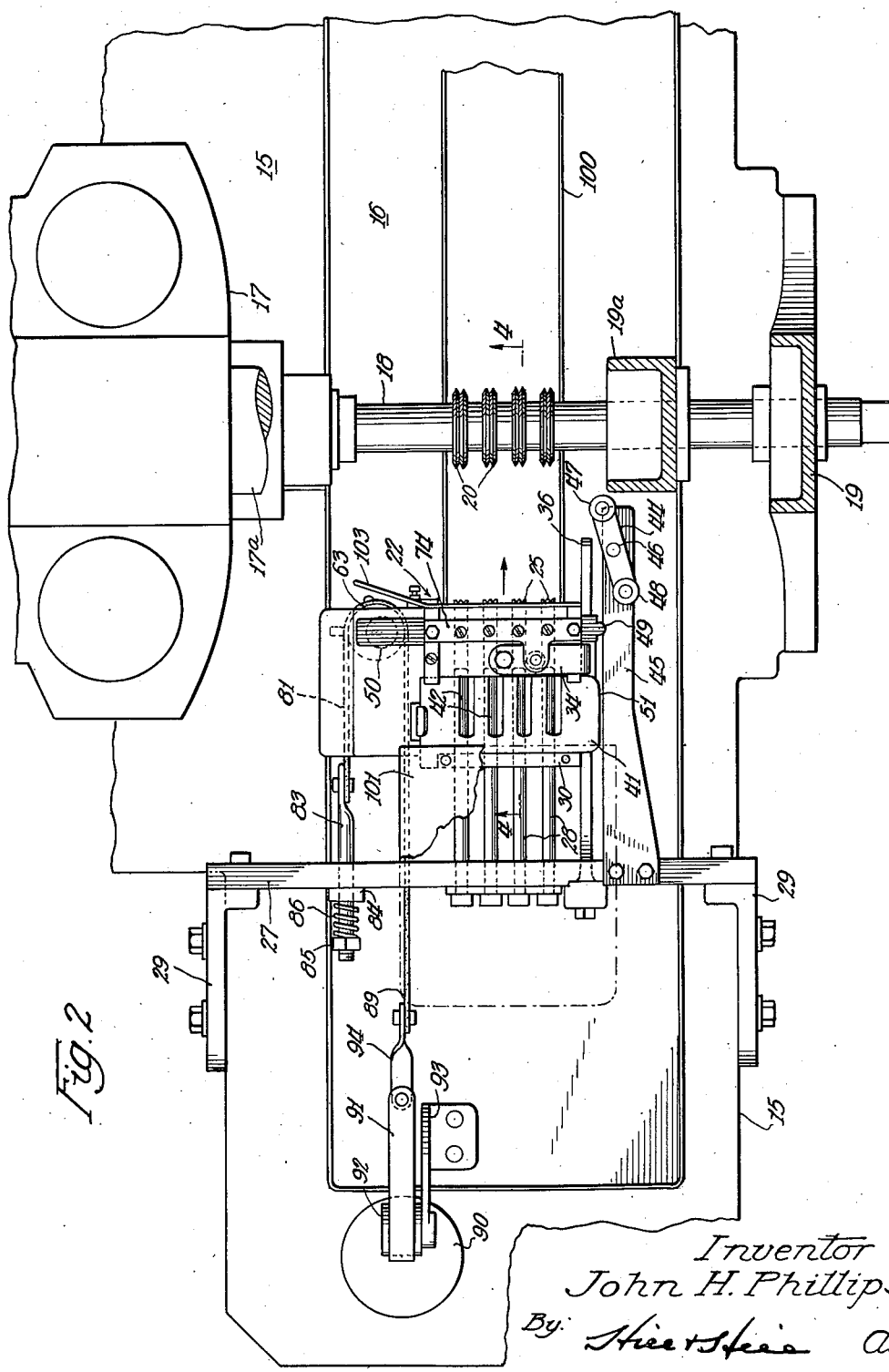

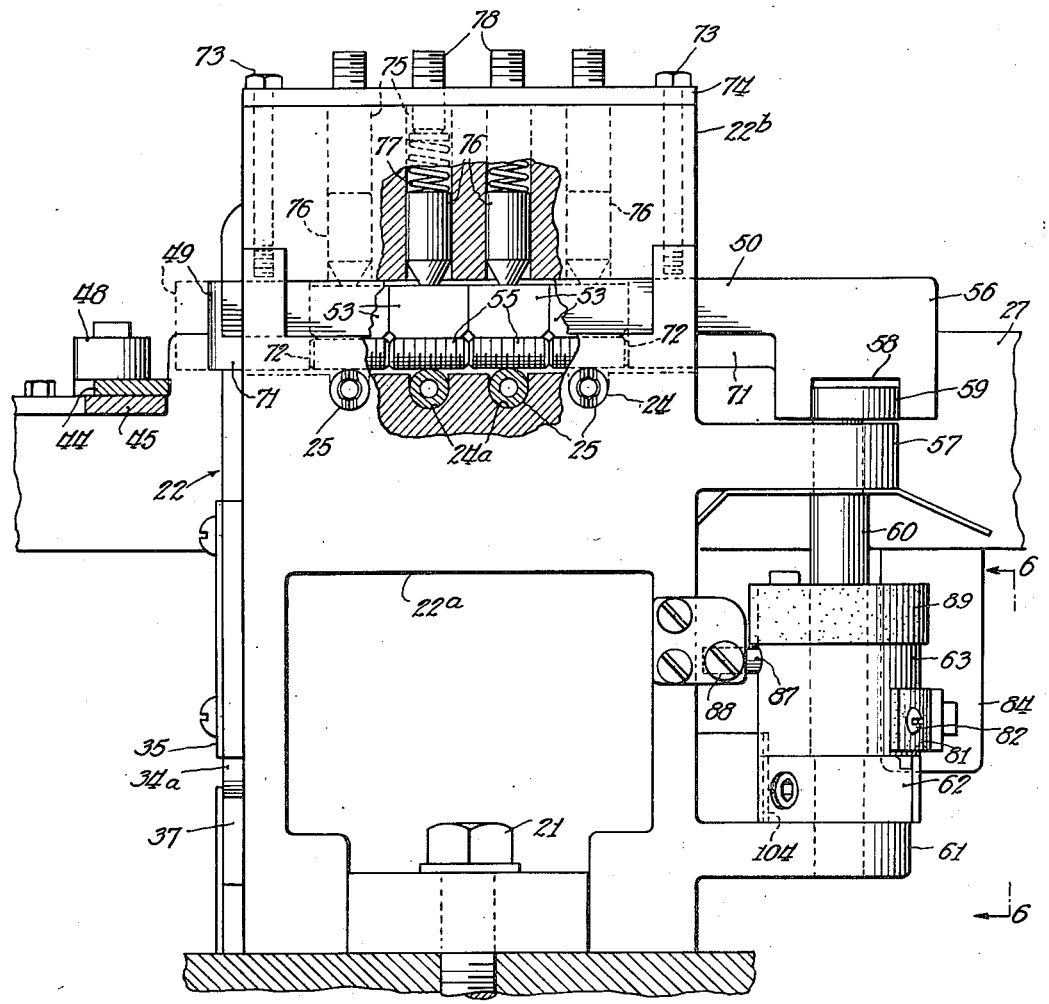

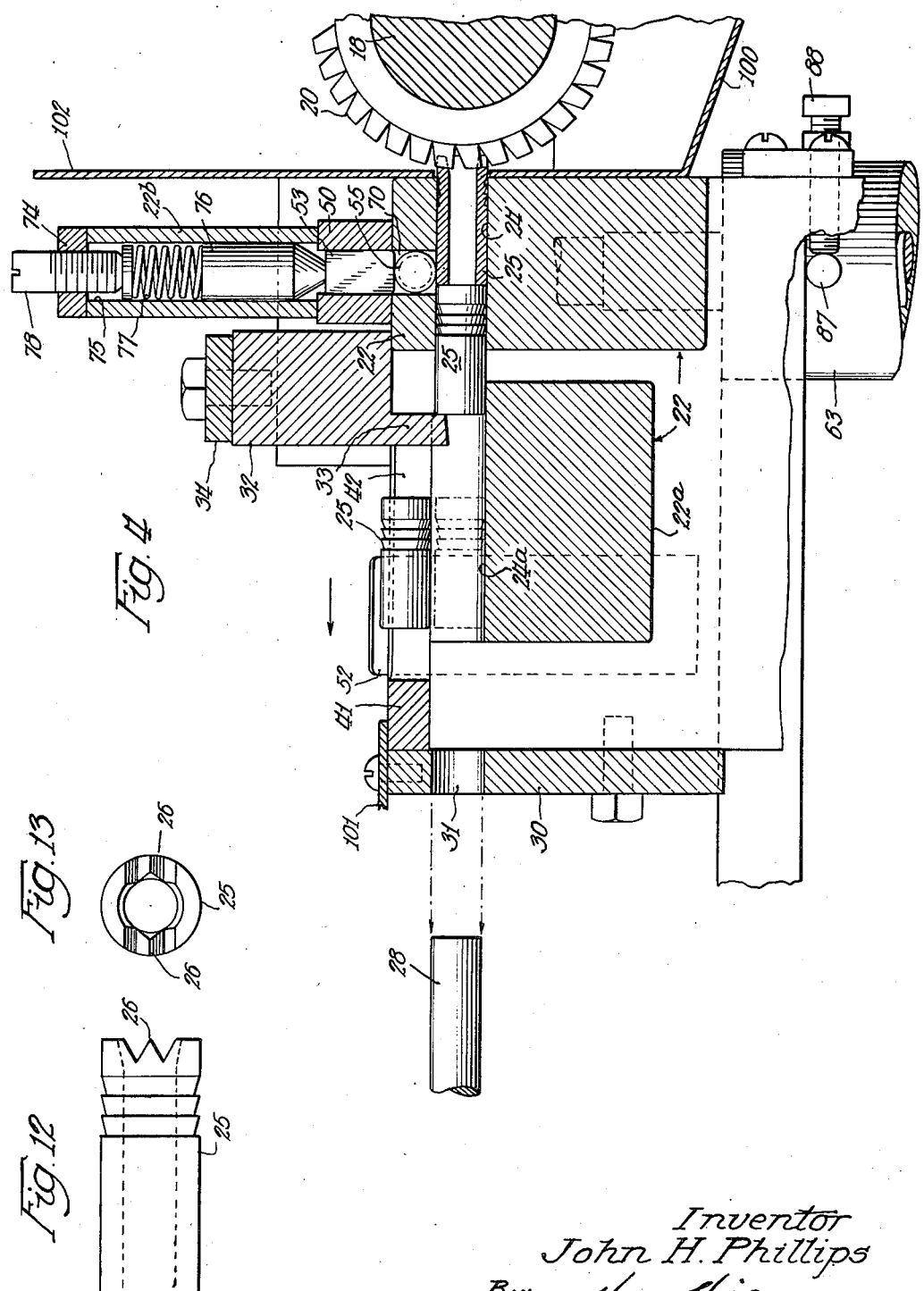

July 8, 1952  J. H. PHILLIPS  2,602,377
WORK FEEDING DEVICE FOR MILLING MACHINES AND THE LIKE
Filed Dec. 3, 1948  6 Sheets-Sheet 5
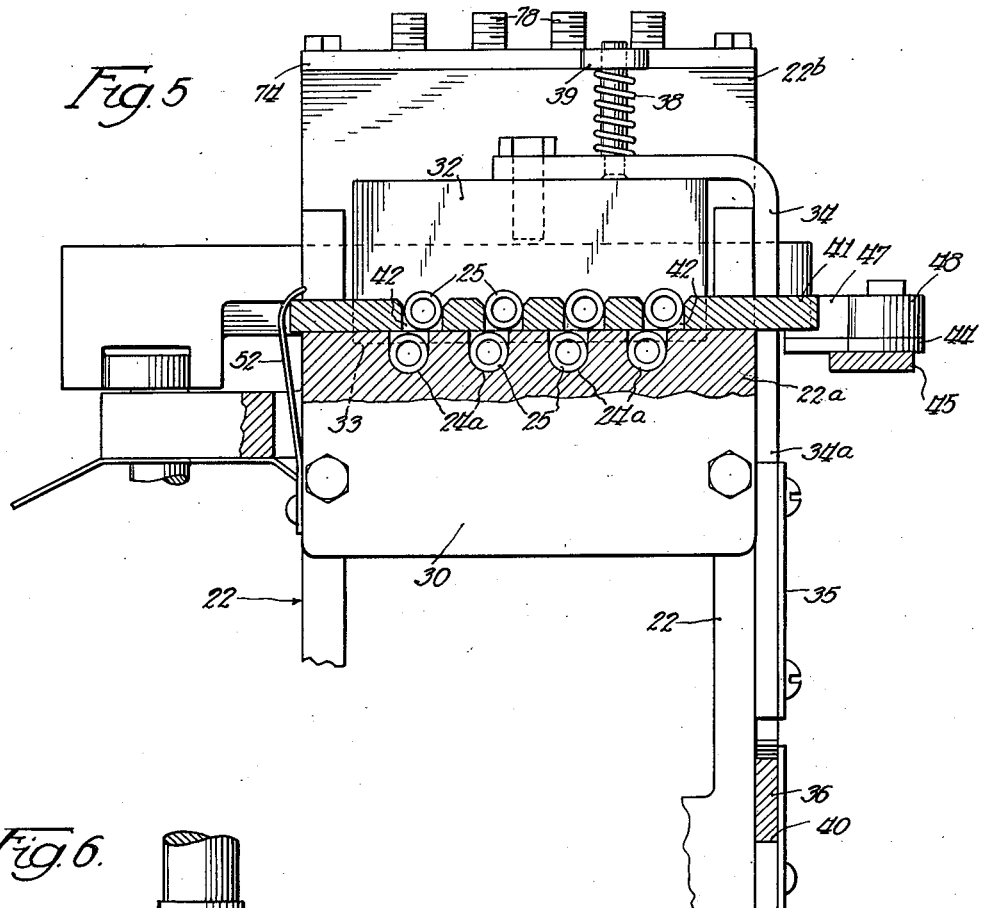
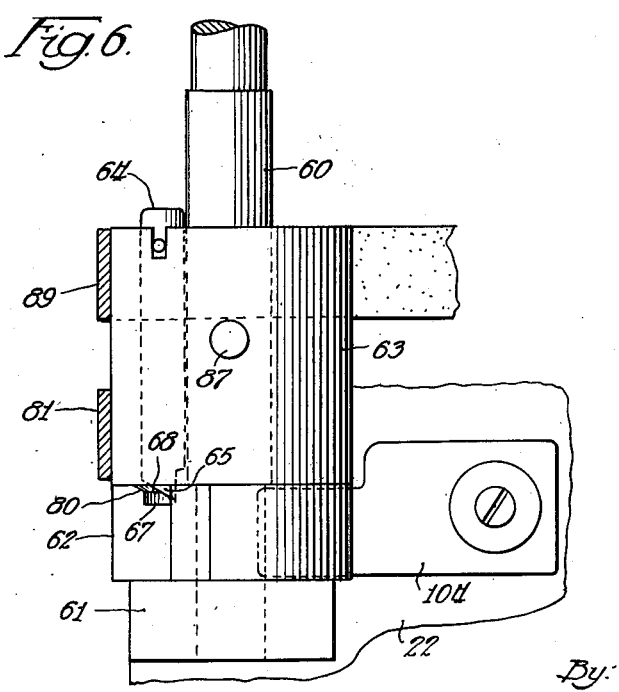
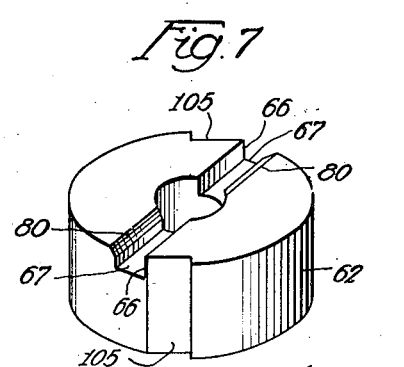
Inventor
John H. Phillips
By: Shire & Shire Attys July 8, 1952   J. H. PHILLIPS   2,602,377
WORK FEEDING DEVICE FOR MILLING MACHINES AND THE LIKE
Filed Dec. 3, 1948   6 Sheets-Sheet 6
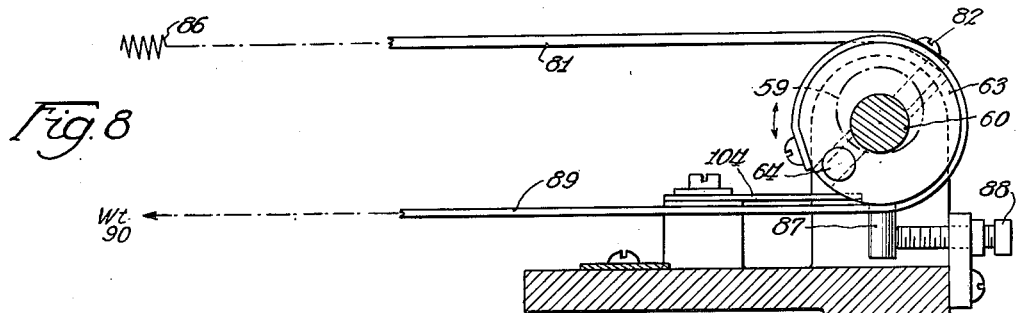
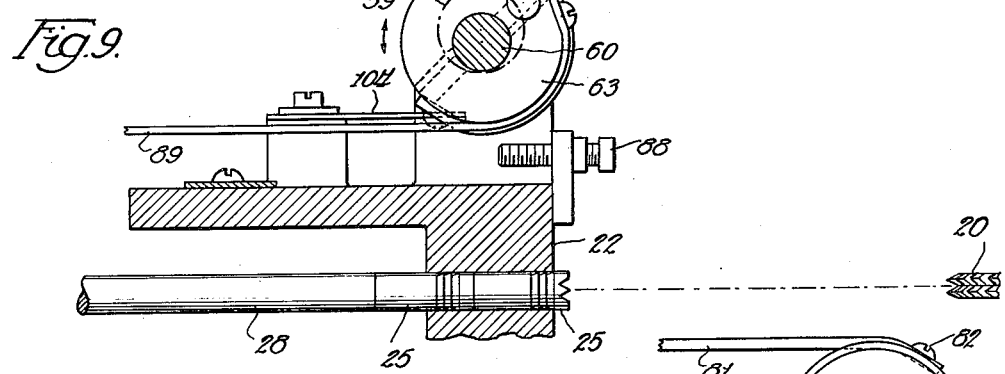
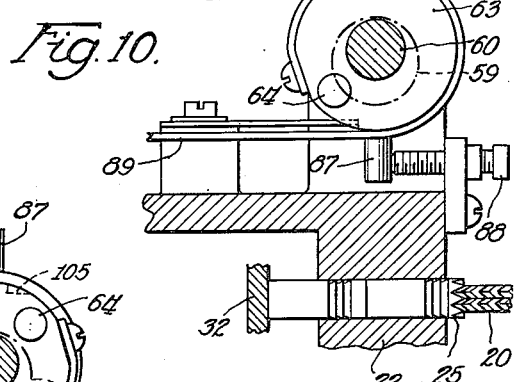
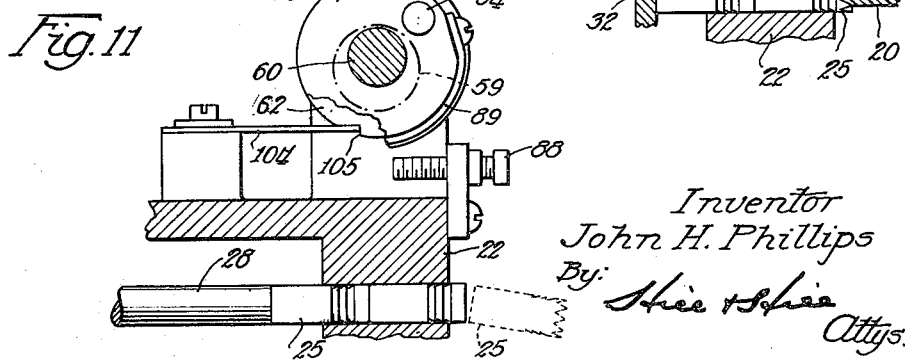
Inventor
John H. Phillips
By: Shire & Shire
Attys.

Patented July 8, 1952

2,602,377

UNITED STATES PATENT OFFICE 2,602,377

WORK FEEDING DEVICE FOR MILLING MACHINES AND THE LIKE

John H. Phillips, Chicago, Ill.

Application December 3, 1948, Serial No. 63,312

20 Claims. (Cl. 90—21)

This invention relates to a work feeding device for milling machines and the like, and its principal object is to provide a work feeding device which is automatic in operation and feeds several pieces of work at a time to cutters which perform cutting operations on the work.

Another object is the provision of a reciprocating head in which the pieces of work are held, together with reciprocating means such as the reciprocating table of a milling machine for engaging the pieces of work with the cutters of the milling machine.

Another object is the provision of an index mechanism for partially rotating the pieces of work so that when moved to the cutters a second time, the cutters will make cuts at a desirable angle to the cuts first made.

In the particular embodiment of the invention illustrated, the work feeding device has been devised for cutting teeth in drills, self-drilling expansion shells, etc., in which teeth are cut at right angles to each other on one end of the drill or shell, and one of the objects of this invention is the provision of an index mechanism that functions to rotate the pieces of work through an angle of 90° after the first cut has been made in a piece of work, whereby the two sets of teeth are cut to extend at right angles to each other.

Another object is to provide a loading means into which the attendant places the pieces of work, together with actuating means to drop the pieces of work into a guide member having grooves aligned with work receiving bores in the head, whereby the pieces of work may be moved into position to engage the cutters.

Another object is the provision of work inserting members for inserting the pieces of work into the bores in position to be acted upon by the cutters and for finally ejecting the finished pieces of work in succession.

Another object is the provision of a back stop for holding the pieces of work in position to be operated on by the cutters, together with the actuating mechanism for retracting the back stop after each cutting operation.

Another object is the provision of adjustable compression means to firmly hold certain work rotating members in engagement with the pieces of work to positively insure that the pieces of work will be partially rotated through the precise angle required.

With these and other objects and advantages in view, this invention consists in the several novel features of construction, arrangement and combination of parts hereinafter fully set forth and more particularly defined in the appended claims.

The invention is clearly illustrated in the drawings accompanying this specification, in which:

Fig. 2 is a plan partly in horizontal section of the parts of the milling machine and work feeding device seen in Fig. 1;

Fig. 3 is a vertical cross section taken on the line 3—3 of Fig. 1, partly broken out;

Fig. 4 is a vertical longitudinal section taken on the line 4—4 in Fig. 2;

Fig. 5 is a vertical cross section taken on the line 5—5 of Fig. 1, partly broken out;

Fig. 6 is a detail side elevation of a drum and collar of the index mechanism;

Fig. 7 is a perspective view of the collar employed in the index mechanism;

Fig. 8 is a view partly in plan and partly in horizontal section of certain members of the index mechanism;

Fig. 9 is a view similar to Fig. 8 but showing the parts in a different position.

Fig. 10 is a view similar to Figs. 8 and 9 but showing the parts in a third position;

Fig. 11 is a view similar to Figs. 8, 9 and 10 but showing the parts in a fourth position;

Fig. 12 is a detail side elevation of one of the drills upon which one cut has been made by the milling machine, and Fig. 13 is an end view of the drill seen in Fig. 12.

Figure 1:
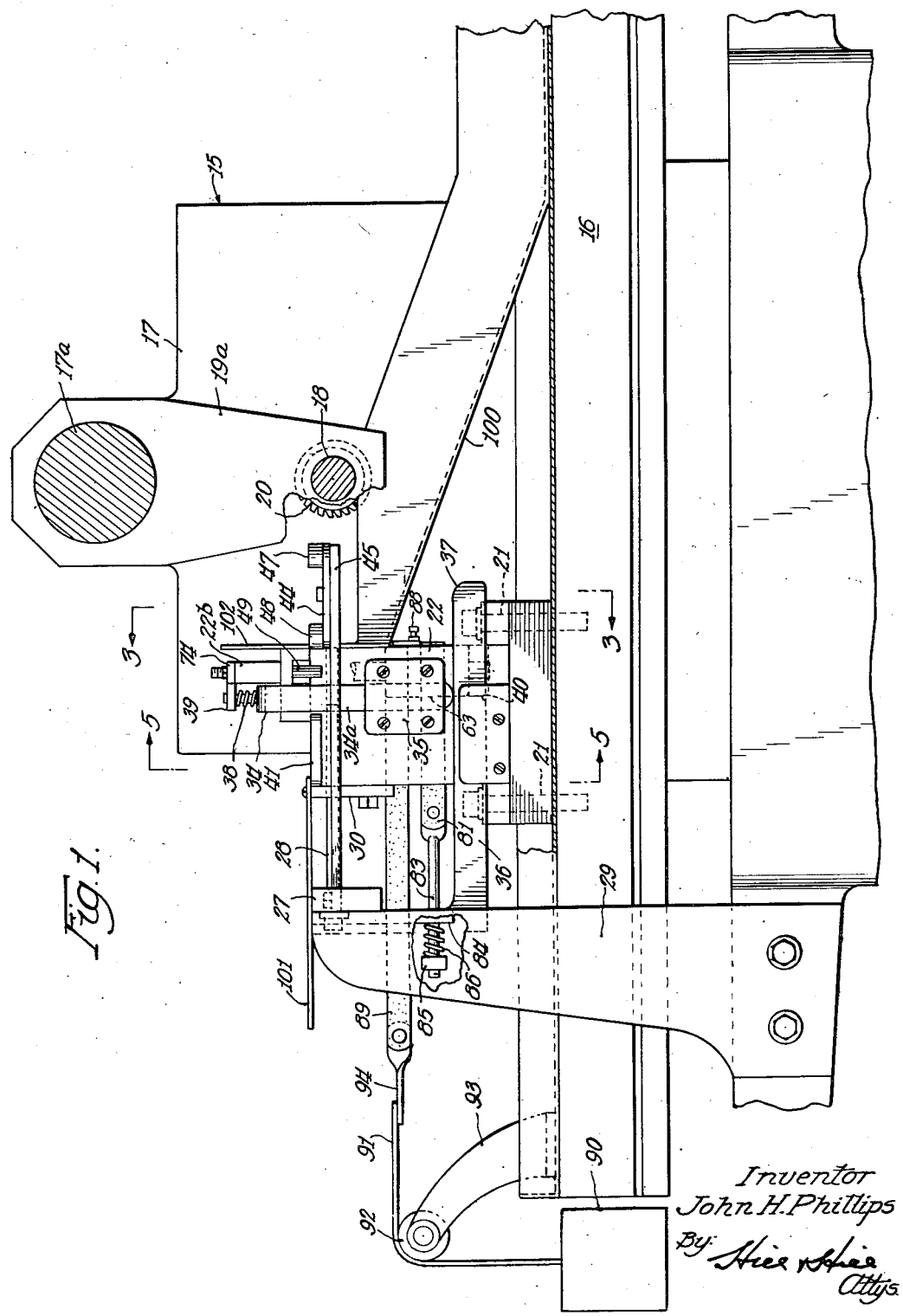
Fig. 1 is a side elevation of a portion of a milling machine illustrating a simple embodiment of the work feeding device applied thereto.

Referring to said drawings, which are merely illustrative of one embodiment of the invention, and referring first to Figs. 1 and 2, the reference character 15 designates a portion of a milling machine of common and well known construction provided with a reciprocating table 16 reciprocated by the operating mechanism (not shown) of the milling machine in the usual manner.

The milling machine shown has a standard 17 from which projects a spindle 18 of the milling machine driven to rotate at relatively high speed. The spindle may also be journaled in an upright 19 of the milling machine frame. A heavy shaft 17a connects the upright 19 with the standard 17, and an arm 19a extends down from the shaft 17a with the spindle 18 extending through it. Rigidly mounted on the spindle is a milling machine cutter 20, which may be composed of individual cutters, four being shown, although there may be more or less numbers of cutters as desired.

Rigidly mounted on the reciprocating table, as by bolts 21 is a head designated generally by the reference character 22 which head reciprocates with the table. The head 22 is formed with bores 24 (see Fig. 4) which are aligned with the respective cutters 20 and are adapted to receive the pieces of work and guide them to the cutters. Aligned with the bores in the upper part of the portion 22a of the head are grooves 24a, the lower faces of which are semi-circular and disposed in coaxial alignment with the bores. The pieces of work are automatically loaded into the grooves and subsequently moved into the bores as will be presently explained. A partly finished piece of work 25 is seen in Figs. 12 and 13 and also in Fig. 4. Other pieces of work are seen in Figs. 3 and 5. Figs. 12 and 13 show a piece of work with the teeth 26 extending in one direction, and this illustrates a piece of work as it appears after the first cut has been made.

Supported on a stationary bar 27 (see Figs. 1 and 2) are several pusher rods 28, four being shown, and these pusher rods are coaxially aligned with the grooves 24a and bores 24 and function to feed the pieces of work into the bores and to eject the finished pieces of work therefrom when the cuts have been completed. The bar 27 is supported by two uprights 29 stationarily mounted on the milling machine body as by bolts or otherwise. The head 22 is also formed with a cross wall 30 (see Fig. 4) formed with holes 31 therein to permit the pusher rods to pass. The pusher rods being stationary, the pieces of work are fed into the bores 24 and ejected therefrom by the head moving toward the pusher rods.

Guided in the head 22 for vertical reciprocation therein is a backstop 32 for the pieces of work. The backstop is shown as formed with flange 33 which, in the down position of the backstop (see Fig. 4) stands behind the two pieces of work 25 in each bore and holds the outermost ones in cutting engagement with the cutters 20 so that when the work is moved up against the teeth of the cutters, the latter cannot push the pieces of work backwards.

Mechanism is provided for raising the backstop above the work so as to permit other pieces of work to be inserted into the bores, and as shown, said mechanism comprises an L-shaped bar 34 (see Fig. 5) bolted or otherwise rigidly secured to the backstop and having one leg 34a extending down along one end face of the head 22 and guided for vertical movement in a bearing member 35 (see also Fig. 1) bolted or otherwise secured to the head 22. An actuating bar 36 carried by the cross bar 27 extends underneath the lower end of the leg 34a, upon which the leg slides; said bar is formed with an inclined edge portion 37 at its forward end which permits the leg to drop, causing the backstop to drop behind the second uncut pieces of work, as is seen in Fig. 4. This downward movement of the back stop takes place just before the first pieces of work are engaged with the cutters. A guide-way 40 fastened to the head 22 prevents any displacement of the actuating bar. A coiled compression spring 38 interposed between the horizontal leg of the bar 34, and a lug 39 formed on a bar 74 mounted on a head extension 22b, facilitates the downward movement of the backstop.

A loading slide 41 (see Figs. 1, 2, 4 and 5) is slidably guided in ways provided on the head for movement transversely of the machine, in which loading slide are several slots 42 paralleling the pusher rods, each slot being of a size to receive a piece of work. The lower face of the loading slide rests upon the upper face of the portion 22a of the head (see Fig. 5) and in its inactive position parts of the loading slide partly overhang the grooves 24a, and parts of the upper face of the portion 22a of the head 22 partly underlie the slots and prevent the pieces of work from dropping into the grooves 24a until the loading slide is shifted to its loading position.

As shown, the actuating means for the loading slide comprises a rock lever 44 (see Figs. 1 and 2) fulcrumed as at 46 on a supporting arm 45 carried by the bar 27 and extending beyond the front face of the head 22 when in its rear position, as seen in Fig. 2. The lever 44 is shown as carrying rollers 47, 48 at its ends, the roller 47 being arranged to be engaged by an end 49 of an index bar 50 during certain strokes of the head 22 and when the end 49 of the index bar engages the roller 47 it partially rotates the lever 44 on its fulcrum and swings the roller 48 against the adjacent edge 51 of the loading slide and shifts it latterly from the position seen in Fig. 5 to one in which the slots 42 register with the grooves 24a, permitting the pieces of work to drop into the grooves in position to be inserted into the bores 24 behind the pieces of work already lying therein. Resilient means, such as flat spring 52 (see Fig. 5) secured to the part 22a of the head 22, functions to restore the loading slide to inactive position when permitted to do so by the lever 44.

Index mechanism is provided for partially rotating the pieces of work that are in position to be operated on by the cutters, and the mechanism illustrated for this purpose will now be described. Slidably mounted in the head 22 to reciprocate transversely thereof is the index bar 50, which is slotted longitudinally to receive pressure blocks 53 one above each bore 24, and below said blocks 53 are screw threaded, knurled or otherwise roughened rolls 55 which are arranged to engage the pieces of work that are in cutting position and partially rotate them when the rolls 55 are moved transversely of the head by the index bar. The threaded rolls 55 are contained in groove 70 formed in the upper face of the head 22 (see Fig. 4), and the index bar 50 is formed with downward extending flanges 72 (see Fig. 3) which travel in the grooves 70 with the threaded rolls confined between the inner edges 72 of the flanges.

One end of the index bar 50 has a downwardly projecting head 56 which extends down to a lug 57 that projects from an end face of the head 22 (see Fig. 3) and in the lower face of the head 56 is a groove 58 which extends crosswise of the index bar. An eccentric roll 59 rotates in said groove and reciprocates the index bar in timed relation to the reciprocating movements of the head 22.

Above the head 22 is the upward extension 22b which may be separate from the main portion of the head and secured thereto by bolts 73 which also fasten the top bar 74 to the extension 22b. In the extension are vertical holes 75, one disposed above each pressure block 53, and contained in said holes are pointed pressure pins 76 which bear against the pressure blocks 53 with coiled compression springs 77 bearing against the upper ends of the pressure pins and confined under pressure by screws 78 threadedly mounted in the bar 74. Any desirable amount of pressure may, therefore, be applied to the pressure blocks and threaded rolls by adjusting the screws so as to provide good contact between the threaded rolls and pieces of work.

The eccentric roll 59 is intermittently rotated by mechanism which will now be described. The roll is keyed or otherwise rigidly secured upon the upper end of an upright shaft 60 which is journaled in the lug 57 and in a lug 61, also projected out from the head 22 at a point below the lug 57 (see Fig. 6). Keyed or otherwise rigidly secured to the lower end of the shaft 60 is a collar 62 which is partially rotated intermittently by an oscillatory drum 63 loosely mounted on the shaft 60 and resting on the collar 62. The driving connection between the drum 63 and collar 62 comprises a detent or vertically reciprocable pin 64 guided for vertical movement in the drum and having a finger 65 on its lower end which is arranged to engage vertical edges 66 of diametrically opposite grooves 67 formed in the upper face of the collar 62. One side of the finger 64 is inclined as at 68 and the edges of the grooves opposite the vertical edges 66 are also inclined as at 80 to enable the detent or pin 64 to ride out of the groove 67 when the drum is rotated in a clockwise direction. When the drum is rotated in a contra-clockwise direction, the finger 65 of the detent 64 engages the upright edge 66 of the groove in which it happens to be and thereby partially rotates the collar.

A flexible connection 81, such as a strap, is partially wound around and secured to the cylindrical face of the drum as by a screw 82 and extends toward the bar 27, its end being riveted or otherwise fastened to a rod 83 which extends through an arm 84 secured to and extending down from the bar 27. A shoulder 85, such as a nut, is threadedly mounted on the end of the rod 83 and a coiled compression spring 86 is interposed between the arm 84 and the nut, and permits of a slight amount of endwise movement of the strap 81 at the ends of the forward movements of the head 22. Movement of the head 22 towards the cutters 20, carrying with it drum 83, causes the strap 81 to unwind from the drum and thereby partially rotates it in a contra-clockwise direction, and the detent 64, being in engagement with the upright side of one of the grooves 67, rotates the collar 62 and therewith the shaft 60 and eccentric roll 59 through an arc of 180° from the position seen in Fig. 11 to that seen in Fig. 8, thereby moving the index bar 50 toward the right, as viewed in Fig. 3. A stop pin 87 secured to and extending out from the drum, and an adjustable stop pin 88 mounted on the head 22, limit the partial rotation of the drum, collar, shaft and eccentric roll to 180°, but since the head 22 has a slightly longer length of travel than is necessary to rotate the eccentric roll through 180°, and inasmuch as the rotation of the drum is limited to 180°, the spring 86 yields as the head 22 continues its forward movement carrying the drum with it.

A second flexible connection 89, such as a strap, is partially wound around and secured to the cylindrical face of the drum as by a screw and its rear end is connected to a weighted body 90 as by a flexible connection 91 which is trained over a sheave 92 journaled in a bracket 93 secured to and extending up from the table 16. A twisted link 94 connects the flexible connections 89, 91. During the forward strokes of the head 22, the drum is partially rotated in a contra-clockwise direction by the strap 81 in unwinding from the drum and, as a result, the flexible connection 89 becomes partially wound upon the drum thereby raising the weighted body 90. When the head 22 is being moved away from the cutters 20, the weight of the body 90 pulls upon the flexible connection 89 and unwinds the same and, as a result, the strap 81 is rewound on the drum but inasmuch as the inclined face of the pin rides up the inclined face of the groove 67, the collar 62 remains stationary, the other parts moving from the position seen in Fig. 8 to that seen in Fig. 9. On the next succeeding stroke of the head 22 towards the cutters 20, the strap 81 is again unwound, the strap 89 rewound, and the drum, collar, shaft and eccentric roll moved to the position seen in Fig. 10.

Each time the index bar 50 is moved in one direction or the other, it moves the threaded rolls 55 through an arc of 90°, thereby rotating the pieces of work with which they are engaged through an arc of 90°.

A flat spring 104 secured to the head 22 co-operates with notches 105 formed in the cylindrical face of the collar 62 to prevent any back lash of the collar.

In a cycle of operation, to make two cuts on each outer piece of work in the bores, and starting with the position seen in Fig. 11 wherein the head 22 has just completed its back stroke at the completion of the second cut, and the pusher rods have moved the pieces of work into each bore forward, the distance equal to the length of a piece of work and have ejected the finished pieces of work, when the head 22 reaches the end of its forward stroke the back stop 32 drops behind the pieces of work (see Figs. 4 and 8); during its forward stroke the index bar 50 has rotated the outer pieces of work through an arc of 90° and as the head reaches the end of its forward stroke, the outer pieces of work are pushed against the cutters which make the first cut. During the back stroke the collar 62, shaft 60, eccentric roll 59 and index bar 50 remain inactive; the position of the parts at the end of the back stroke is shown in Fig. 9. On the next forward stroke of the head 22, the index bar 50 is moved back, thereby rotating the outer pieces of work through an arc of 90°, and when the outer pieces of work are again engaged with the cutters, the second cut is made (see Fig. 10).

The attendant having placed uncut pieces of work in the slots 42 of the loading slide 41, then when the end 49 of the index bar engages the roll 47 of the lever 44 and swings it upon its fulcrum, the roller 48 engages the edge of the loading slide and shifts the latter, permitting the pieces of uncut work to fall into the grooves 24a. On the back stroke the back stop is raised and the last deposited uncut pieces of work are moved by the pusher rods against the other uncut pieces of work and at the end of the back stroke of the head the finished pieces of work are ejected and the uncut outer pieces of work are moved into the position seen in Fig. 11.

During the forward strokes of the head 22 in which the second cut is made, the index bar is moved from the position seen in full lines in Fig. 3 to that seen in dotted lines, thereby bringing the end 49 of the index bar into the position for engaging the roller 47 of the lever 44, thereby loading uncut pieces of work into the grooves.

A chute 100 secured to the head 22 may be provided to receive the finished pieces of work as they are ejected from the bores and conduct the pieces of work to the milling machine table or to some other receptacle.

A shield 101 secured to the top of the wall 30 projects rearwardly therefrom and projects the pusher rods from chips that might fly from the cutters. Other shields 102 and 103 secured to the head 22 are provided for preventing chips from striking the head 22 or other operative parts thereof.

The indexing means for partially rotating the pieces of work has been designed to partially rotate several pieces of work simultaneously, and inasmuch as the several pieces of work that are in position to be partially rotated are likely to be of slightly different diameter, and because of the individual pressure blocks and threaded rolls (one set for each piece of work in position to be partially rotated) the individual springs will press each threaded rod into close contact with a piece of work regardless of any slight variation in its diameter and thereby insure partial rotation thereof.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. The combination with milling machines and the like, comprising in combination cutters, means for rotating the same, of a work feeding device comprising a reciprocating head movable longitudinal of the machine toward and away from the cutters and having one or more bores therein paralleling the line of movement of the head and adapted to guide the pieces of work to and from the cutters, a vertically movable back stop adapted in its lowermost position for holding the work against the cutters during the cutting operation and means to vertically move the back-stop to an inactive position after the cut has been made.

2. The combination with a work feeding device for a milling machine, comprising in combination cutters, means to rotate the same, of a stationary bar operatively mounted on the milling machine and including one or more pusher rods, a reciprocating head movable toward and away from the cutters and having one or more bores therein paralleling the line of movement of the head and in operative relationship with the pusher rods and adapted upon reciprocation of the head to guide pieces of work to and from the cutters whereby the pusher rods are adapted to feed pieces of work into the bores and to eject finished pieces of the work therefrom when the cuts have been completed, index means operatively engaging the periphery of the work pieces within the aforesaid bores to partially rotate the pieces of work and means to actuate said index means.

3. A work feeding device for milling machines and the like, comprising in combination cutters, means to rotate the same, a reciprocating head movable toward and away from the cutters and having one or more bores therein paralleling the line of movement of the head and adapted to guide pieces of work to and from the cutters, index means to partially rotate the work within a bore comprising a reciprocating index bar guided in the head and having threaded rods spring pressed against the work, an eccentric roll engaging the index bar and arranged to reciprocate the same, and means to rotate said eccentric roll in timed relation to the reciprocating movements of the head.

4. A work feeding device for milling machines and the like adapted for end milling a work piece, comprising in combination rotating cutters, means for rotating the same, a reciprocating head movable toward and away from the cutters and having one or more bores therein paralleling the line of movement of the head and adapted to guide pieces of work to and from the cutters, a back stop adapted for vertical movement for holding the work against the cutters during the cutting operation and cooperative means on the back stop and on a stationary part of the device to move the back stop vertically to an inactive position after the cut has been made.

5. A work feeding device for a milling machine adapted for end milling a work piece, said milling machine comprising in combination rotating cutters, means to rotate the same, a stationary bar operatively mounted on the milling machine and including one or more pusher rods, said work feeding device including a reciprocating head movable toward and away from the cutters and having one or more bores therein paralleling the line of movement of the head and in operative relationship with the pusher rods and adapted upon reciprocation of the hood to guide pieces of work to and from the cutters, index means to rotate the work through an arc of 90° within a bore and means to actuate said index means, whereby the pusher rods are adapted to feed pieces of work into the boxes and to eject finished pieces of the work therefrom when the cuts have been completed.

6. A work feeding device for milling machines and the like, comprising in combination rotating cutters, means to rotate the same, a reciprocating head movable toward and away from the cutters and having one or more bores therein paralleling the line of movement of the head and adapted to guide pieces of work to and from the cutters, index means to partially rotate the work comprising a reciprocating index bar guided in the head and having threaded rods engaging the work within a bore, pressure blocks bearing against said rods, springs bearing against the blocks, an eccentric roll engaging the index bar and arranged to reciprocate the same, and means to rotate said eccentric roll in timed relation to the reciprocating movements of the head.

7. A work feeding device for milling machines and the like, comprising in combination a cutter, means to rotate the same, a reciprocating head movable toward and away from the cutter and having a bore therein paralleling the line of movement of the head and adapted to guide pieces of work to and from the cutter, index means to partially rotate the work, comprising a reciprocating index bar guided in the head and having threaded rods spring-pressed against the work, an eccentric roll engaging the index bar and arranged to reciprocate the same, a shaft on which the eccentric roll is mounted, a collar rigidly mounted on said shaft, a drum loosely mounted on said shaft, a clutch connection between said collar and drum, a flexible connection, one end of which is secured to the drum, and the other end yieldably connected to a stationary element of the device, said flexible connection functioning to partially rotate the drum and therewith the collar when the head is moving toward the cutter, a second flexible connection, one end of which is secured to the drum and its other end is trained over a sheave and having a weighted block secured on said end, said weighted block and flexible connection functioning to rotate the drum in a reverse direction independently of the collar.

8. A work feeding device for milling machines and the like, comprising in combination a cutter, means to rotate the same, a reciprocating head movable toward and away from the cutter and having a bore therein paralleling the line of movement of the head and adapted to guide pieces of work to and from the cutter, index means to partially rotate the work, comprising a reciprocating index bar guided in the head and having threaded rods spring-pressed against the work, an eccentric roll engaging the index bar and arranged to reciprocate the same, a shaft on which the eccentric roll is mounted, a collar rigidly mounted on said shaft, a drum loosely mounted on said shaft, a clutch pin carried in the drum and arranged to engage in notches in the collar, a flexible connection, one end of which is secured to the drum, and the other end yieldably connected to a stationary element of the device, said flexible connection functioning to partially rotate the drum and therewith the collar when the head is moving toward the cutter, a second flexible connection, one end of which is secured to the drum and its other end is trained over a sheave and having a weighted block secured on said end, said weighted block and flexible connection functioning to rotate the drum in a reverse direction independently of the collar.

9. A work feeding device for milling machines and the like, comprising in combination a milling cutter, means to rotate the same, a reciprocating head movable toward and away from said cutter, and having a bore therein paralleling the line of movement of the head and adapted to guide pieces of work to and from the cutter, a vertically movable back-stop for holding the work against the cutter during the cutting operation, means to move the back-stop vertically to an inactive position after the cutting operation has ceased, means for loading pieces of work behind the work in the bores, stationary pusher rods for engaging the last loaded work upon movement of the head away from the cutter, whereby the cut work is ejected and uncut work moved to an intermediate position in the bores.

10. A work feeding device for milling machines and the like, having a milling cutter and means for rotating the same, comprising a reciprocating head movable toward and away from said cutter and having a bore therein paralleling the line of movement of the head, a loading groove aligned with said bore, means to load said grooves with work behind the work in the bores, and a stationarily mounted pusher rod aligned with said bore and functioning to move the work toward the discharge end of the bore, whereby the cut work is discharged from the bore.

11. A work feeding device for milling machines and the like, having several milling cutters and means to rotate the same, comprising a reciprocating head movable toward and away from said cutters, and having several bores therein paralleling the line of movement of the head and adapted to guide pieces of work to and from the cutters, a vertically movable back-stop for holding the work against the cutters during the cutting operation, cooperating means on the back-stop and a stationary element of the device to move the back-stop to an inactive position vertically after the cutting operation has ceased, means for loading pieces of work behind the work in the bores, stationary pusher rods for engaging the last loaded work upon movement of the head away from the cutter, whereby the cut work is ejected and uncut work moved to an intermediate position in the bores.

12. A work feeding device for milling machines and the like, having several milling cutters and means for rotating the same, comprising a reciprocating head movable toward and away from said cutters and having several bores therein paralleling the line of movement of the head, loading grooves aligned with said bores, slotted means to load said grooves with pieces of work behind the work in the bores, and stationarily mounted pusher rods aligned with said bores and functioning to move the work toward the discharge end of the bores, whereby the cut work is discharged from the bores.

13. A work feeding device for milling machines and the like, comprising in combination several milling cutters, means for rotating said cutters, a reciprocating head movable toward and away from the cutters and having several bores therein paralleling the line of movement of the head, loading grooves aligned with said bores, a work loading slide having slots therein above the grooves and of a width to permit work to drop through the slots into the grooves, said slots normally being out of register with the grooves, with the work in the slots resting upon the upper walls adjacent the grooves, means to shift the loading slide to bring the slots therein into register with the grooves, whereby the work may fall into the grooves, and means to restore the loading slide to normal position.

14. A work feeding device for milling machines and the like, having several milling cutters and means for rotating said cutters, comprising a reciprocating head movable toward and away from the cutters and having several bores therein paralleling the line of movement of the head, loading grooves aligned with said bores, a work loading slide having slots therein above the grooves and of a width to permit work to drop from the slots into the grooves, said slots normally being out of register with the grooves, with the work in the slots resting upon the upper walls adjacent the grooves, a rocker arm rotatably mounted on a stationary support and having one end adapted to engage an end of the loading slide and thereby shift it into a position where the slots register with the grooves, a reciprocating member carried by the head, and means to project an end of said member into engagement with the other end of said rocker arm when the head is moving toward the milling cutters.

15. The combination with a milling machine and the like, having several milling cutters and means for rotating said cutters, of a work feeding device comprising a reciprocating head movable toward and away from the cutters and having several bores therein paralleling the line of movement of the head, loading grooves aligned with said bores, a work loading slide having slots therein above the grooves and of a width to permit work to drop through the slots into the grooves, said slots normally being out of register with the grooves, while the work in the slots rests upon the upper walls adjacent the grooves, index means to shift the loading slide to bring the slots therein into register with the grooves, whereby the work may fall into the grooves, and resilient means to restore the loading slide to normal position.

16. A work feeding device for milling machines and the like, comprising in combination several milling cutters, means for rotating said cutters, a reciprocating head movable toward and away from the cutters and having several bores therein paralleling the line of movement of the head, loading grooves carried by the head and aligned with said bores, a work loading slide having slots therein above the grooves and of a width to permit work to drop through the slots into the grooves, said slots normally being out of register with the grooves, with the work in the slots resting upon the upper walls adjacent the grooves, a rocker arm rotatably mounted on a stationary support and having one end adapted to engage an end of the loading slide and thereby shift it into a position where the slots register with the grooves, a reciprocating index bar carried by the head, means to project an end of said bar into engagement with the other end of said rocker arm when the head is moving toward the milling cutters, whereby to shift the loading slide into position with the slots in register with the grooves, and means to restore the loading slide to normal position with its slots out of register with the grooves.

17. A work feeding device for milling machines and the like, having several milling cutters and means for rotating said cutters, comprising a reciprocating head movable toward and away from the cutters and having several bores therein paralleling the line of movement of the head, loading grooves aligned with said bores, a reciprocating work loading slide having slots therein above the grooves and of a width to permit work to drop through the slots into the grooves, said slots normally being out of register with the grooves, with the work in the slots resting upon the upper walls adjacent the grooves, a rocker arm rotatably mounted on a stationary support and having one end adapted to engage an end of the loading slide and thereby shift it into a position where the slots register with the grooves, an index bar reciprocating in the head, means to project an end of said index bar into engagement with the other end of said rocker arm when the head is moving toward the cutters, whereby to shift the loading slide into position with the slots in register with the grooves, and resilient means to restore the loading slide to normal position with the slots out of register with the grooves.

18. A work feeding device for milling machines and the like, having several milling cutters and means for rotating said cutters, comprising a reciprocating head movable toward and away from the cutters and having several bores therein paralleling the line of movement of the head, loading grooves carried by the head and aligned with said bores, a work loading plate slidably mounted in the head and having slots therein above the grooves and of a width to permit work to drop through the slots into the grooves, said slots normally being out of register with the grooves, with the work in the slots resting upon the upper walls adjacent the grooves, a rocker arm rotatably mounted on a stationary support and having one end adapted to engage an end of the loading plate and thereby shift it into a position where the slots register with the grooves, an index bar reciprocating in the head, means to project an end of said index bar into engagement with the other end of said rocker arm when the head is moving toward the cutters, whereby to shift the loading plate into position with the slots in register with the grooves, and means to restore the loading plate to normal position with the slots out of register with the grooves.

19. The combination with a work feeding device for a milling machine, said milling machines comprising in combination cutters, of a stationary bar operatively mounted on the milling machine and including one or more pusher rods, work feeding means having bores therein to receive pieces of work and operatively mounted with respect to the pusher rods, whereby the pusher rods are adapted to feed pieces of work into the boxes, work rotating means for rotating a work piece within a bore, individual to each piece of work in position to be cut, means to actuate said work rotating means, and said pusher rods upon completion of the cuts adapted to eject the finished pieces of work from the boxes.

20. A work feeding device for milling machines and the like adapted for end milling work pieces, comprising in combination, cutters, a reciprocating head having bores therein to receive pieces of work, means to move said head and therewith the pieces of work toward the cutters, a stationary bar adapted to be operatively mounted on the aforesaid milling machines and the like and including one or more pusher rods in operative relationship with respect to the aforesaid boxes, whereby the pusher rods are adapted to feed pieces of the work into the boxes, work rotating means for rotating a work piece within a bore, individual to each piece of work in position to be cut, means to actuate the work rotating means.

JOHN H. PHILLIPS.

REFERENCES CITED

The following references are of record in the file of this patent:

UNITED STATES PATENTS

| Number | Name | Date |
|---|---|---|
| 1,477,178 | La Ducer | Dec. 11, 1923 |
| 1,610,976 | Schramm | Dec. 14, 1926 |
| 1,938,783 | Romaine et al. | Dec. 12, 1933 |
| 1,961,124 | Archea | June 5, 1934 |
| 2,017,913 | Marsilius | Oct. 22, 1935 |